(12) United States Patent
Cross

(10) Patent No.: US 7,992,690 B2
(45) Date of Patent: Aug. 9, 2011

(54) DEVICE FOR LOCKING A LEVER OF A MOTOR VEHICLE

(76) Inventor: James William Cross, Yukon, PA (US)

( * ) Notice: Subject to any disclaimer, the term of this patent is extended or adjusted under 35 U.S.C. 154(b) by 1128 days.

(21) Appl. No.: 11/675,661

(22) Filed: Feb. 16, 2007

(65) Prior Publication Data

US 2008/0047768 A1    Feb. 28, 2008

Related U.S. Application Data

(60) Provisional application No. 60/775,069, filed on Feb. 21, 2006.

(51) Int. Cl.
*B62L 3/00* (2006.01)

(52) U.S. Cl. .................. 188/24.18; 74/473.25; 74/551.1; 74/551.7

(58) Field of Classification Search ............... 188/24.18; 180/218; 192/114 R; 74/473.1, 473.24, 74/473.25, 501.5 R, 502.2, 527, 551.1–551.3, 74/551.7, 551.8
See application file for complete search history.

(56) References Cited

U.S. PATENT DOCUMENTS

| | | | | | |
|---|---|---|---|---|---|
| 4,316,531 | A | * | 2/1982 | Harpster | 192/114 R |
| 6,389,928 | B1 | * | 5/2002 | Kobayashi et al. | 74/536 |
| 2009/0139823 | A1 | * | 6/2009 | Dyer | 192/114 R |
| 2009/0242307 | A1 | * | 10/2009 | Miyabe | 180/230 |

FOREIGN PATENT DOCUMENTS

| | | | | |
|---|---|---|---|---|
| JP | 2001202148 | A | * | 7/2001 |
| JP | 2003112684 | A | * | 4/2003 |
| JP | 2006345767 | A | * | 12/2006 |

* cited by examiner

*Primary Examiner* — Pam Rodriguez
(74) *Attorney, Agent, or Firm* — James R. Williams

(57) ABSTRACT

The present invention describes a device for locking a lever of a motor vehicle. The device permits an operator to quickly lock the lever in an engaged position and unlock the lever from the engaged position. The device may be used even when the manual dexterity of the operator is limited by protective equipment. The device includes a pin and spring. The pin passes through aligned holes in the flange and lever. Releasing the lever exerts a lateral force on the pin, thereby preventing the pin from lifting from the lever hole and locking the lever in the engaged position. The spring lifts the pin from the locked position when the lateral force is reduced. The device may be used on a brake or clutch lever of a motorcycle, thereby permitting the operator to have at least one free hand at a stop.

18 Claims, 4 Drawing Sheets

DEVICE FOR LOCKING A LEVER OF A MOTOR VEHICLE

The present invention claims priority to U.S. provisional application No. 60/775,069, filed Feb. 21, 2006.

FIELD OF THE INVENTION

The invention relates to device for locking a lever in an engaged position on a motor vehicle without continuous effort by an operator, and is especially adapted to lock the handbrake of a motorcycle.

BACKGROUND OF THE INVENTION

Motor vehicles may include hand levers that operate braking or gear shifting mechanisms. For example, standard motorcycle design includes a right-hand brake lever, a right-foot brake pedal, and a left-hand clutch lever. The right-hand lever engages a braking mechanism on the front wheel, and the foot pedal engages a braking mechanism on the rear wheel. The levers are typically mounted on flanges of the handlebar adjacent to the handgrips. Squeezing the right-hand lever applies a braking force. Releasing the lever disengages the braking force. Similarly, squeezing the clutch lever engages the clutch. Depression and release of the foot pedal engages and disengages the rear brake, respectively.

An operator of a motorcycle may come to a stop and wish to place both feet on the ground for stability, especially when a passenger is aboard. Placing both feet on the ground will necessarily disengage the foot brake pedal. The operator must then continue to squeeze the right-hand brake lever or the motorcycle could roll freely. At the same time, the operator must squeeze the left-hand lever to engage the clutch so that the engine does not stall while in a driving gear.

While stopped, the operator would often like to have both feet on the ground and at least one free hand. The operator could place the motorcycle in neutral and release the left-hand grip while keeping the right-hand brake lever engaged. While this technique advantageously maintains braking during the stop, it forces the operator to shift the motorcycle out of neutral and back into a driving gear before moving forward. Alternatively, the operator could keep the motorcycle in gear, engage the left-hand clutch lever, and release the right hand lever. Disadvantageously, the motorcycle is left without a brake force and is free to roll. This alternative is not tenable on an incline.

A need exists for a device that permits the operator of a stopped motorcycle to place both feet on the ground for stability and have at least one free hand while maintaining braking force and keeping the motorcycle in gear. The device could be used to lock either the right-hand braking lever or the left-hand clutch lever. Advantageously, the mechanism would be easy to engage and disengage, especially when riding gloves hinder the dexterity of an operator.

SUMMARY OF THE INVENTION

The present invention describes a device that locks a lever of a motor vehicle in an engaged position. The device includes a pin that prevents release of the lever. On a motorcycle, the device may be used with either the brake or clutch lever. The device may be original equipment or retro-fitted to a motor vehicle. Preferably, the device is mounted so that it can be engaged using the thumb or forefinger of the operator.

In a broad aspect, the device is mounted on a lever flange and includes a spring along the long axis of a pin. The flange defines a flange hole large enough to permit the pin to pass through. Squeezing the lever moves the lever to an engaged position. Releasing the lever would normally return it to the disengaged position. The lever defines a lever hole that aligns with the flange hole when the lever is in the engaged position. The operator enables the device by squeezing the lever so that the holes align. The spring holds the pin away from the lever until the operator pushes the pin into holes and releases the lever. The lever tries to return to the disengaged position and thereby exerts a lateral force on the pin. The force is sufficient to hold the pin in place against the retraction force of the spring. The pin prevents the lever from returning to the disengage position. By squeezing the lever, the operator can realign the holes so that the lateral force is released and the spring lifts the pin out of the hole in the lever.

In one embodiment, the device includes a pin comprising flared ends. The first flared end passes through lever flange hole. The lever includes a lever hole. The spring rests on the lever flange and the second flared end retains the spring around the pin. The spring holds the pin above the lever. The operator may engage the lever and depress the pin into the aligned lever flange and lever holes. The spring should have a spring constant high enough to hold the pin above the lever in the disengaged position. The spring constant should simultaneously be low enough that, in the engaged position, the lateral force of the lever is enough to retain the pin in the holes.

In another embodiment, the device includes upper and lower housings surrounding the pin and spring. The lower housing may be screwed into a threaded hole of the lever flange. The upper and lower housings retain the spring around the pin. In still another embodiment, a retaining washer secures the lower housing to the flange.

DETAILED DESCRIPTION OF THE INVENTION

The device will include a pin, a flange retainer, a spring and a spring retainer. The pin cooperates with holes in the flange and lever to secure the lever in the engaged position. The lever is designed to move back to the disengaged position when an operator releases the lever. While in the engaged position, the lever and flange exert a lateral force on the pin when the pin is pressed into the holes and the operator releases the lever. The lateral force exerts sufficient friction on the pin that the spring does not lift the pin from the lever hole.

The flange retainer secures the pin in the flange. The flange retainer may be a flaring or abutment along or at the end of the pin, a housing in which the pin is secured, a spring clamp, such as a C-clamp, an O-ring, a washer, a nut, or any other known retainer. The spring operates between the flange and the spring retainer. The spring may be a helical coil, snap ring, Belleville washer, leaf spring, an elastomeric sleeve, or other means capable of lifting the pin from the holes when the lateral pressure is relieved. The spring retainer may be, for example, flaring or abutment along or at the end of the pin, a housing in which the pin is secured, a spring clamp, such as a C-clamp, an O-ring, a washer, a nut, or any other known retainer. The spring retainer will be connected to the pin so that the spring lifting the spring retainer will also lift the pin.

The spring will have a spring constant. The spring constant should be sufficiently high to keep the pin above the lever hole until the operator pushes the pin into the hole. Simultaneously, the spring constant must be low enough that it will not overcome the lateral force exerted on the pin by the lever while the pin is in the engaged position. The lever attempting to move back to the unengaged position creates this lateral force on the pin along an axis perpendicular to the long axis of the pin. The lateral force generates a frictional force sufficient to retain the pin in the holes. The frictional force may be affected, for example, by material selection and surface roughness as well as grease, oil, and dirt.

Figure 1:
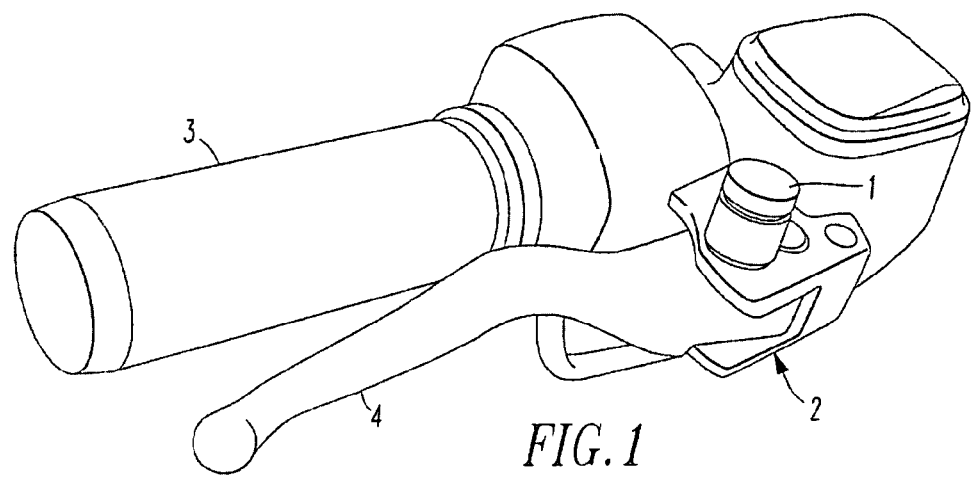
FIG. 1 is a side view of the device on a motorcycle.
Figure 2:
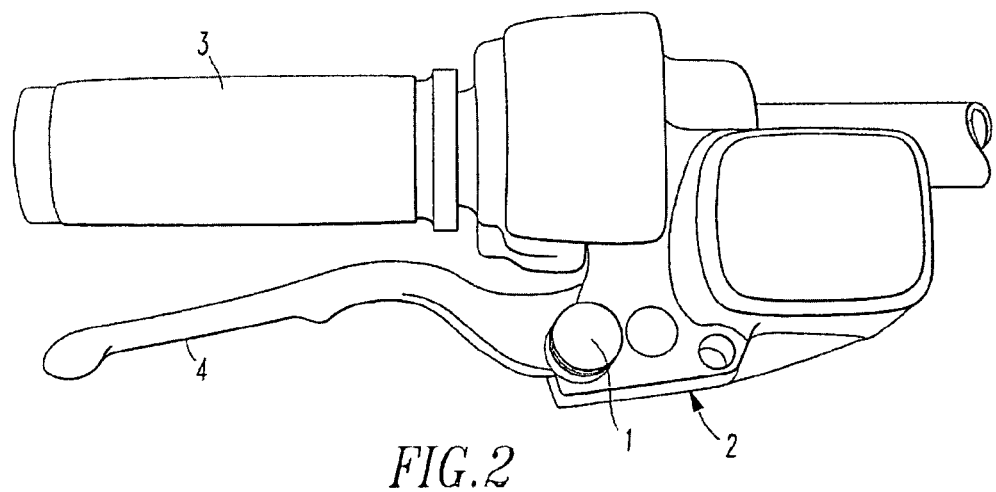
FIG. 2 is a top view of the device on a motorcycle.

FIGS. 1 and 2 show one such device 1 as mounted on a motorcycle lever flange 2. The device 1 is preferably mounted close to the handgrip 3 for the convenience of the operator. The lever 4 is shown in the engaged position. In this position, pressing down on the device forces the pin (not shown) into a pair of aligned holes in the flange 2 and lever 4. Releasing the lever 4 exerts a lateral force on the pin that secures the pin in the holes, thereby preventing the lever 4 from moving to the disengaged position.

Figure 3:
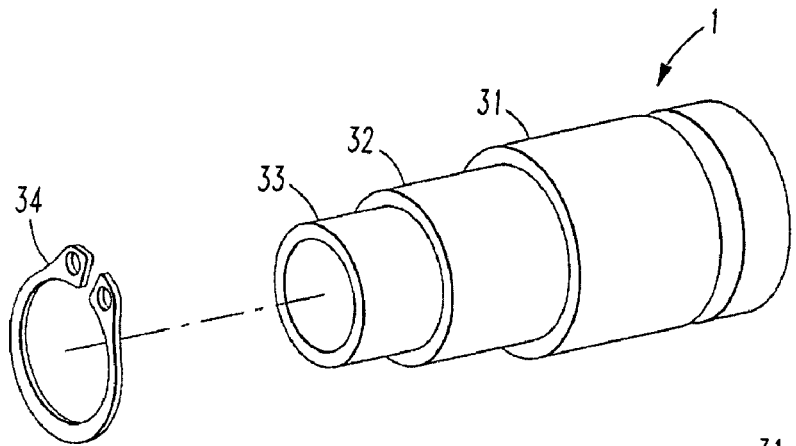
FIG. 3 shows the device of FIGS. 1 and 2 removed from the motorcycle.
Figure 4:
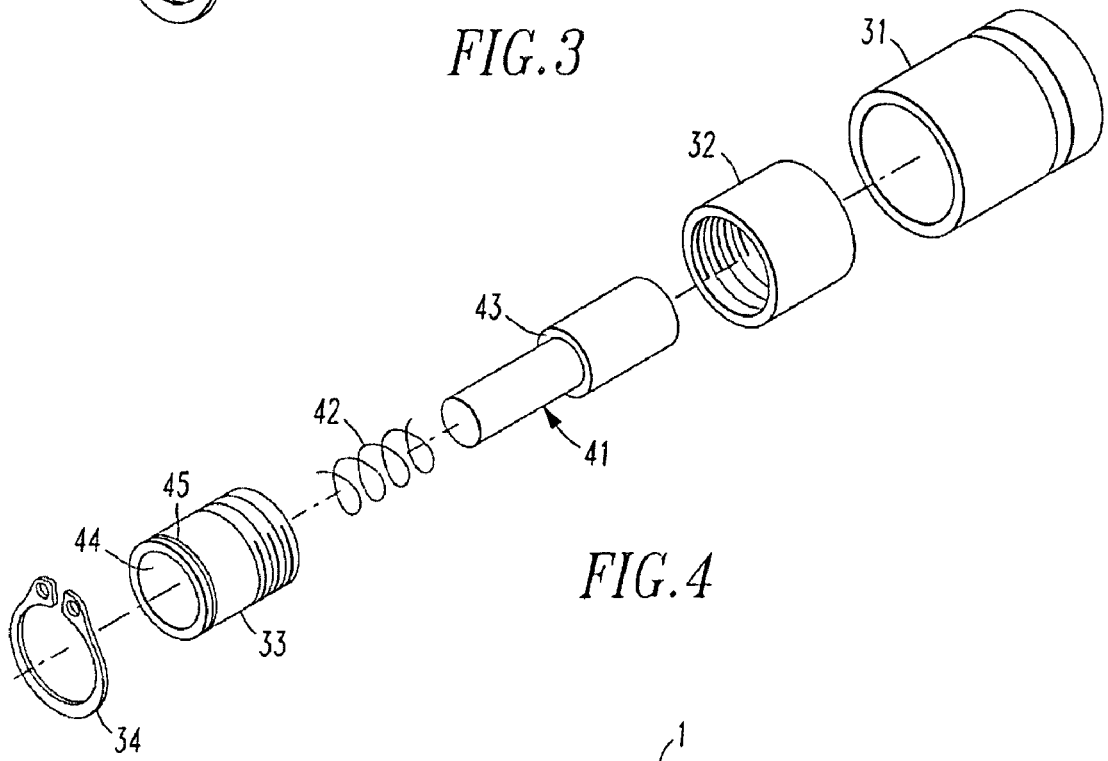
FIG. 4 is an exploded view of the device of FIG. 3.

FIG. 3 shows one embodiment of the device 1. The device includes an upper housing 32, a lower housing 33, and a C-clamp fastener 34. As shown, the device also includes an optional ornamental cover 31. The device 1 is disassembled in FIG. 4, and includes a pin 41, a spring 42 designed to fit over at least a portion of the long axis of the pin 41. In the present embodiment, the pin 41 includes an abutment 43 for seating of the spring 42. The lower housing 33 fits through a lever flange hole (not shown). The hole may be threaded or unthreaded; although, the fastener 34 makes a threaded hole unnecessary. The lower housing 33 includes a groove 45 for seating of the fastener 34. The lower housing 33 may include an increase in diameter that prevents the lower housing 33 from passing completely through the flange hole. For example, the outer diameter of the lower housing 33 may be of a frusto-conical shape that increases in diameter away from the groove 45. Alternatively, an abrupt increase in diameter may be present, such as a step or threads. In the present embodiment, the C-clamp fastener 34 fits into the groove 45 and locks the lower housing 33 to the flange. The spring 42 slides over the pin 41 against the abutment 43, and the spring/pin assembly is placed into an inner cavity 44 of the lower housing 33. The inner cavity 44 may have a shelf on which the spring 42 rests. Alternatively, the spring 42 may rest directly on the lever flange. The spring 42 should be sufficiently large that it cannot pass through flange hole. The upper housing 32 screws onto the lower housing 33, fixes the spring/pin assembly in the housings, and prevents the lower housing from passing through the flange hole. An ornamental cover 31 may be fixed over the upper housing 32 using any number of retaining means, including clips, set screws, threads, friction pads, etc.

Figure 4A:
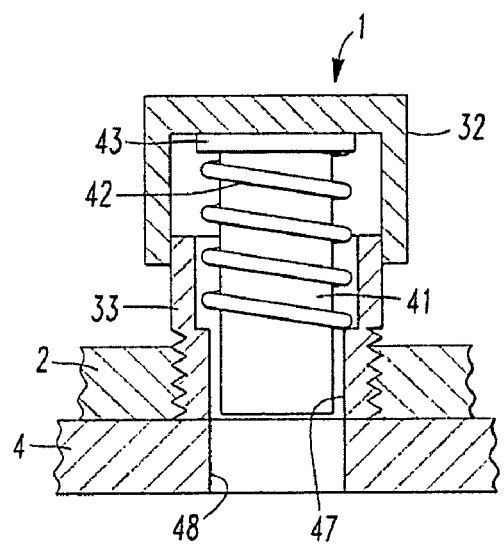
FIG. 4A is a cross-sectional view of the device on a motorcycle.

FIG. 4A shows one embodiment of the device 1 installed on a motor vehicle. The lower housing 33 screws into a threaded flange hole 47 of the flange 2. An upper housing 32 secures a pin 41. A spring 42 operates between the flange 2 and an abutment 43 on the spring 41. The spring 42 is too large to fit through the flange hole 47. The spring 42 keeps the pin 41 above the lever hole 48 of the lever 4 until an operator pushes down on the upper housing 32, thereby forcing the pin into the lever hole 48.

Figure 5:
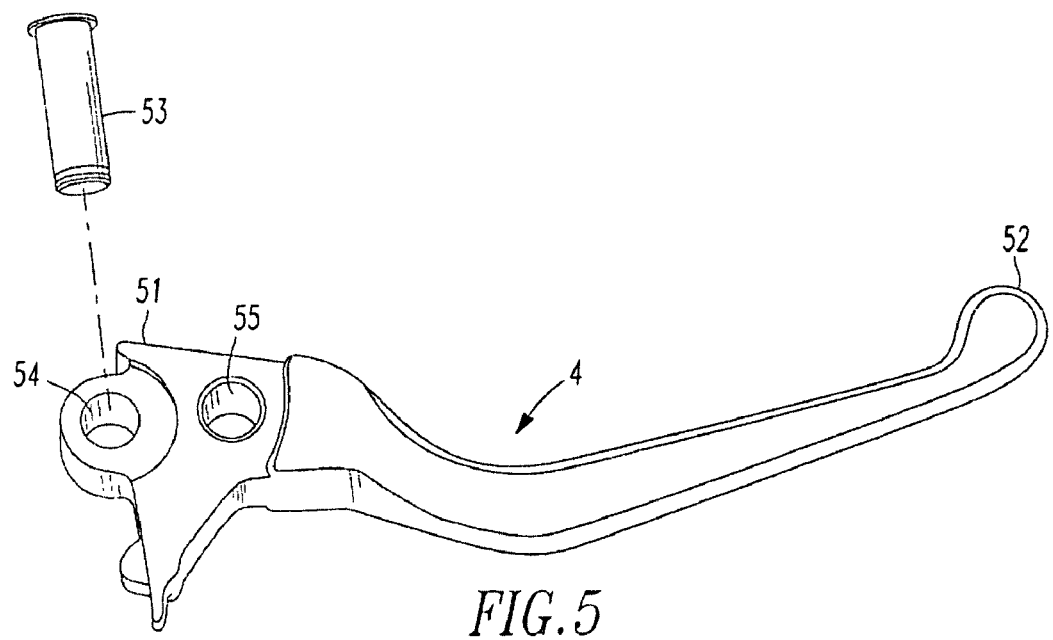
FIG. 5 shows the lever of FIGS. 1 and 2 removed from the motorcycle.
Figure 6:
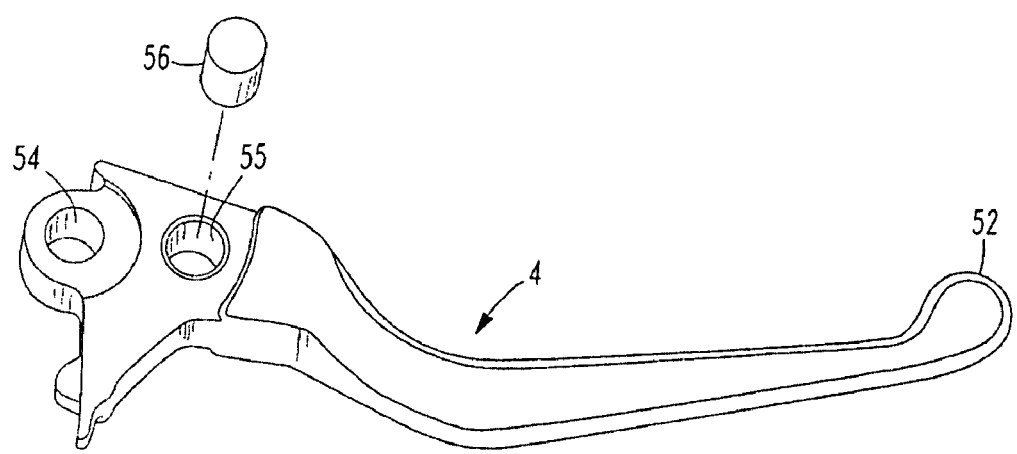
FIG. 6 shows an alternative embodiment of the lever.

FIG. 5 shows a lever 4 adapted for use with the device and removed from the motorcycle. The lever 4 includes a first end 51 that fits into the lever flange (not shown) and a second end 52 that extends from the flange and on which an operator can act. The first end 51 defines a passage 54 and a lever hole 55. A retaining pin 53 passes through the flange and the passage 54, thereby securing the lever 4 to the flange. The lever hole 55 accepts the pin (not shown) of the device. The lever hole 55 may be a throughbore, as shown, or may be a blind passage having a bottom. Alternatively, as shown in FIG. 6, the lever hole 55 may defined by an insert 56. Inserts are often used for reducing rattling of the lever 4 in the flange. The insert 56 is often a plastic material, such as a polyolefin or nylon. The insert 56 is then drilled to define the lever hole for the pin.

Figure 7:
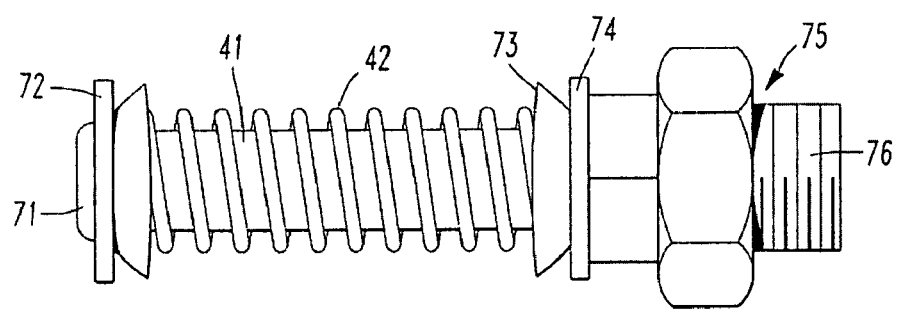
FIG. 7 is an alternative embodiment of the device.

FIG. 7 shows an alternative embodiment of the invention. The pin 41 has a flared bottom 71. At least one washer 72 may be used to stabilize the pin 41 on the flange. The inner diameter of the washer will be too small to slide over the flared bottom. Alternatively without the washer, the spring will be too small to slide over the flared bottom 71. The flared bottom 71 should be too large to fit through the flange hole but should be small enough to fit through the lever hole. The pin 41 may also include a flared top 73 and may include at least another washer 74. A spring 42 surrounds the pin 41 and acts between the flared top 73 and the flange (not shown). This embodiment includes an end piece 75 having a threaded end 76. The threaded end 76 permits fixing of an ornamental cover.

Figure 8:
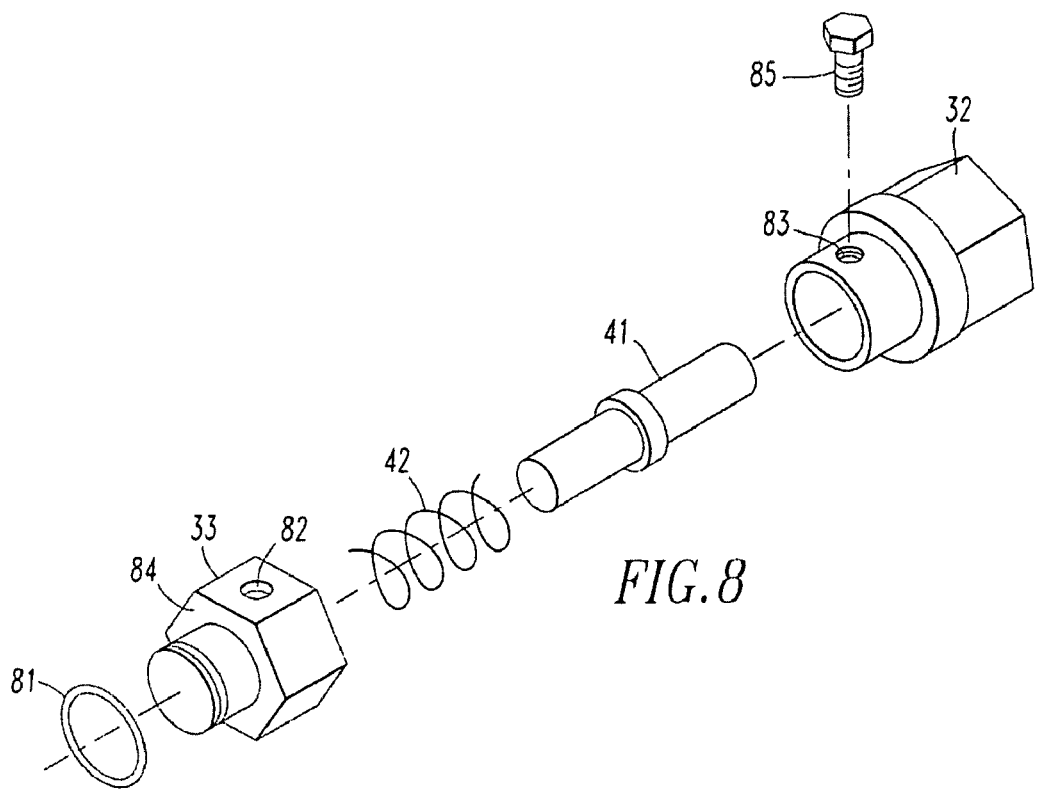
FIG. 8 is an exploded view of another embodiment of the device.

A second alternative embodiment, FIG. 8, shows an O-ring 81, a lower housing 33, a spring 42, a pin 41, and an upper housing 32. The lower housing 33 includes an unthreaded alignment port 82. The upper housing 32 includes a threaded port 83. When assembled, the lower housing 33 fits through a hole in the lever flange and is fixed to the flange by the O-ring 81 and the protrusion 84 of the lower housing 33. The spring 42 fits over the pin 41 and the spring/pin assembly is placed in the inner cavity 44 of the lower housing 33. The upper housing 32 is placed into the lower housing 33 and the unthreaded port 82 and threaded port 83 are aligned. A setscrew 85 is screwed through the aligned ports and secures together the upper and lower housings.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

What is claimed is:

1. A device for locking a lever of a motor vehicle, the lever secured to the motor vehicle by a flange, the lever capable of moving relative to the flange from a disengaged position to an engaged position, the flange defining a flange hole and the lever defining a lever hole, the flange and lever holes aligning in the engaged position, the device comprising:
    a) a pin comprising a long axis, a flange end, and a retainer end, the flange end secured to a flange retainer, the retainer end secured to a spring retainer; and
    b) a spring along the long axis of the pin, the spring having a spring constant and operating between the flange retainer and the spring retainer, whereby the long axis of the pin is capable of simultaneously passing through the flange hole and lever hole when the lever is in the engaged position and the spring constant is high enough to support the pin above the lever hole in the disengaged position, and the spring constant is low enough that a lateral force exerted by the lever in the engaged position prevents the pin from lifting from the lever hole.

2. The device of claim 1, wherein the flange retainer is selected from a group consisting of a C-clamp, an O-ring, a flaring of the pin, an abutment of the pin, a washer, a nut, and a housing.

3. The device of claim 1, wherein the spring retainer is selected from a group consisting of a C-clamp, an O-ring, a flaring of the pin, an abutment of the pin, a washer, a nut, and a housing.

4. The device of claim 1, wherein the flange retainer includes a lower housing and the spring retainer includes an upper housing, and the lower and upper housings are attached by a fastener.

5. The device of claim 1, wherein the spring is selected from a group consisting of a helical coil, snap ring, Belleville washer, leaf spring, and an elastomeric sleeve.

6. A motorcycle including a lever secured by a flange and a device for locking the lever, the lever capable of moving relative to the flange from a disengaged position to an engaged position, the flange defining a flange hole and the lever defining a lever hole, the flange and lever holes aligning in the engaged position, the device comprising:
   a) a pin comprising a long axis, a flange end, and a retainer end, the flange end secured to a flange retainer, the retainer end secured to a spring retainer, the long axis of the pin is capable of simultaneously passing through the flange hole and lever hole when the lever is in the engaged position; and
   b) a spring along the long axis of the pin, the spring having a spring constant and operating between the flange retainer and the spring retainer, the spring constant being high enough to support the pin above the lever hole in the disengaged position, and the spring constant being low enough that a lateral force exerted by the lever in the engaged position prevents the pin from lifting from the lever hole.

7. The motorcycle of claim 6, wherein the flange hole and lever hole are through holes.

8. The motorcycle of claim 6, wherein the flange hole is a through hole and the lever hole is a blind hole.

9. The motorcycle of claim 6, wherein the lever includes an insert that defines the lever hole.

10. The motorcycle of claim 9, wherein the insert comprises a plastic material.

11. The motorcycle of claim 6, wherein the flange retainer includes a housing secured to the flange.

12. The motorcycle of claim 11, wherein the housing includes a lower housing attached to an upper housing, the lower housing secured to the flange, and the upper housing including the spring retainer.

13. The device of claim 12, wherein the housing encloses the spring.

14. The device of claim 11, wherein the housing includes a threaded exterior screwed into the flange hole.

15. The device of claim 11, wherein the housing increases in diameter so that only a portion of the housing passes though the flange hole, and a fastener secures the housing in the flange hole.

16. A method for locking a lever of a motor vehicle, the lever secured to the motor vehicle by a flange, the lever capable of moving relative to the flange from a disengaged position to an engaged position, the flange defining a flange hole and the lever defining a lever hole, the flange and lever holes aligning in the engaged position, the method comprising:
   a) pushing a spring-loaded pin through the flange hole and lever hole while the holes are in the engaged position; and
   b) releasing the lever so that a lateral force exerted by the lever in the engaged position prevents the pin from lifting from the lever hole, whereby the lever is prevented from moving to the disengaged position,
wherein the spring-loaded pin comprises a long axis, a flange end, and a retainer end, the flange end secured to a flange retainer, the retainer end secured to a spring retainer, a spring along the long axis of the pin, the spring having a spring constant and operating between the flange retainer and the spring retainer, the spring constant high enough to support the pin above the lever hole in the disengaged position.

17. The method of claim 16, wherein the flange retainer includes a housing secured to the flange.

18. The method of claim 17, wherein the housing includes a lower housing attached to an upper housing, the lower housing secured to the flange, and the upper housing including the spring retainer.

* * * * *